United States Patent [19]

Asakura

[11] Patent Number: 4,705,416

[45] Date of Patent: Nov. 10, 1987

[54] POSITIONING DEVICE FOR POSITIONING TYPE-WHEEL INDEX MOTOR IN A PRINTER

[75] Inventor: Hideo Asakura, Nagoya, Japan

[73] Assignee: Brother Kogyo Kabushiki Kaisha, Aichi, Japan

[21] Appl. No.: 832,232

[22] Filed: Feb. 24, 1986

[30] Foreign Application Priority Data

Feb. 27, 1985 [JP] Japan .......................... 60-27575[U]
Mar. 8, 1985 [JP] Japan .......................... 60-33816[U]

[51] Int. Cl.$^4$ .......................................... B41J 1/30

[52] U.S. Cl. .......................... 400/144.2; 400/175; 400/353; 400/356

[58] Field of Search .................. 400/144.2, 144.3, 175, 400/320, 352, 353, 356

[56] References Cited

U.S. PATENT DOCUMENTS

| | | | |
|---|---|---|---|
| 4,324,496 | 4/1982 | Link | 400/144.2 |
| 4,395,145 | 7/1983 | Giacone et al. | 400/175 |
| 4,423,971 | 1/1984 | Hira et al. | 400/144.2 |
| 4,493,569 | 1/1985 | Kawahara et al. | 400/144.2 |
| 4,553,868 | 11/1985 | Crosio | 400/356 |
| 4,576,493 | 3/1986 | Staniszewski | 400/175 |
| 4,613,244 | 9/1986 | Okabayashi et al. | 400/144.2 |

FOREIGN PATENT DOCUMENTS

| | | | |
|---|---|---|---|
| 44659 | 4/1981 | Japan | 400/144.2 |
| 56-144969 | 11/1981 | Japan | 400/144.2 |
| 6467 | 1/1985 | Japan | 400/144.2 |

*Primary Examiner*—Edgar S. Burr
*Assistant Examiner*—David A. Wiecking
*Attorney, Agent, or Firm*—Parkhurst & Oliff

[57] ABSTRACT

A positioning device in a printer, for positioning an index motor for a type wheel selectively in an operative position in which the motor shaft is coupled to the type wheel, or an inoperative position in which the motor shaft is disengaged from the type wheel. The index motor is supported by a motor holder on a carriage of the printer such that the motor and the holder are movable between the two positions. The motor holder is biased toward its second or inoperative position. The positioning device includes a stopper fixed to the carriage, a pivotal support fixed to the motor holder, and an operating lever which includes as integral parts thereof: a base portion; a pivot portion adjacent to the base portion, at which the lever is supported by the pivotal support pivotally in a plane parallel to a direction of movements of the motor holder; an operator-controlled operating portion; a first abutment portion engageable with the stopper to hold the motor holder in the first position; a second abutment portion engageable with the stopper to hold the motor holder in the second position; a spring portion for biasing the lever in a direction that causes the first and second abutment portions to engage the stopper.

12 Claims, 9 Drawing Figures

POSITIONING DEVICE FOR POSITIONING TYPE-WHEEL INDEX MOTOR IN A PRINTER

BACKGROUND OF THE INVENTION

1. Field of the Art

The present invention relates to a positioning device in a typewriter or other printers, for positioning an index motor for a type wheel selectively in an operative position for coupling of the motor to the type wheel, or an inoperative position for diconnection of the motor from the type wheel to permit a change of the type wheel from one to another.

2. Related Art Statement

In a printer which uses a type wheel having type fonts, it is required that the type wheel can be readily changed from one to another. To meet this requirement, it is proposed to employ an arrangement wherein a motor holder supporting an index motor for the type wheel is linearly or pivotally moved between a first position in which the motor shaft is coupled to the type wheel, and a second position in which the motor shaft is disconnected from the type wheel so as to permit the type wheel to be removed for installation of another type wheel. In this arrangement, the index motor is placed selectively in its operative and inoperative positions. With the motor holder moved to its second position, the index motor is retracted away from the type wheel, and there is provided a relatively ample space or opening for easy removal and installation of the type wheel.

An example of a motor positioning device of the type indicated above is disclosed in Japanese Patent Application No. 55-50198 which was laid open in 1981 under Publication No. 56-144969. In the disclosed arrangment, an index motor is supported on a motor holder which is slidably movable on a carriage of the printer. The motor holder is biased by a torsion spring in a direction away from the type wheel (away from a platen of the printer). The holder has a pivot pin fixed thereto to pivotally support a latching lever and an operating lever. These levers are biased by respective coil springs. In the meantime, there is fixed to the carriage a stationary plate which has a protruding tab engageable with an latching end of the latching lever. The positioning device described above is operated in the following manner. When the motor holder is moved to its first position from its second position in which the type wheel is disconnected from the motor shaft, the operating lever is operated against the biasing force of the torsion spring, thereby moving the motor holder and the index motor toward the type wheel in order to couple the motor shaft to the type wheel. The motor holder is held in this first position by the latching lever with its latching end engaging the protruding tab of the stationary plate. When the motor holder is moved from the first position toward the second position, the operating lever is operated in the reverse direction. The pivotal movement of the operating lever will cause the latching lever to be pivoted in a direction that causes the latching end to disengage from the protruding tab of the stationary plate. Consequently, the motor holder and the index motor are moved to its second position by the biasing force of the torsion spring.

The motor positioning device described above requires many functionally different components such as the pivot pin, latching lever, operating lever and coil springs, as well as the protruding tab of the stationary plate which cooperates with the latching lever to form latching or stopper means for holding the motor holder in its first position. The use of such a relatively large number of parts makes it troublesome to assemble the device, and leads to increasing the cost of manufacture.

Another inconvenience is experienced in the conventional motor positioning device. Commonly, the type wheel is molded of an elastic resin material and consequently elastically yields in a slight degree when the drive shaft of the index motor engages the type wheel. More specifically, upon forced engagement of the motor shaft with suitable engagement means such as a torsion spring provided at the central part of the type wheel, a force is applied to the engagement means whereby the type wheel and the engagement means are elastically deformed or deflected. As a result, the motor shaft must be moved a further distance beyond the predetermined first position, to achieve complete engagement of the motor shaft with the engagement means of the type wheel, or to avoid a possible failure of coupling between the motor shaft and the type wheel. Thus, the operator has to check if the motor shaft has been correctly coupled to the type wheel. To solve this inconvenience, the previously-identified Japanese Patent Application proposes a solution in which the latching lever is formed with an elongate hole through which the previously indicated pivot pin extends to pivotally support the latching lever. In this arrangement, the motor holder and the index motor are moved toward the type wheel, beyond the first position, in order to assure complete engagement of the motor shaft with the engagement means on the type wheel. At the same time, the latching end of the latching lever engages the protruding tab of the stationary plate. With an operating force removed from the operating lever, the motor holder is moved back to its first position, by the biasing force of the previously indicated torsion biasing spring, by a distance corresponding to an allowance provided between the pivot pin and the elongate hole.

While the above proposed arrangement is useful to avoid possible failure of coupling of the motor shaft and the type wheel, the arrangement suffers from the same inconveniences as previously described, namely, increased number of components parts of the positioning device, and consequent difficulty in assembling and increased cost of manufacture of the device.

SUMMARY OF THE INVENTION

It is accordingly an object of the present invention to provide an improved device for positioning an index motor for a type wheel of a printer, selectively in its operative or inoperative position, which is simple in construction, easy to assemble and economical to manufacture.

Another object of the invention is to provide such a positioning device using an operating lever which has as integral parts thereof various portions capable of attaining different functions that are served by separate parts in a conventional counterpart.

A further object of the invention is to provide such a positioning device which has means for assuring complete coupling of the index motor to the type wheel before or when the index motor has been placed in its operative position.

According to the present invention, there is provided a positioning device in a printer, for positioning an index motor for a type wheel selectively in an operative and an inoperative position, the index motor having a drive shaft which is removably engageable with the type wheel, when the index motor is moved to the operative position, to rotate the type wheel for selecting each of multiple type fonts provided on the type wheel, the drive shaft being disengageable from the type wheel when the index motor is moved to the inoperative position, the printer including a platen, a carriage movable along the platen, a motor holder which is provided on the carriage to support the index motor between the operative and inoperative positions and which is movable between a first and a second position corresponding to the operative and inoperative positions, repectively, and biasing means for biasing the motor holder toward its second position, the positioning device comprising: (1) a stopper fixedly provided on the carriage; (2) a pivotal support fixedly provided on the motor holder; and (3) an operating lever comprising as integral parts thereof (a) a base portion, (b) a pivot portion which is adjacent to the base portion, and at which the operating lever is supported by the pivotal support, (c) an operating portion which extends from the base portion, and at which the operating lever is manipulated by an operator of the printer, (d) a first abutment portion engageable with the stopper to hold the motor holder in the first position against a biasing force of the biasing means, (e) a second abutment portion engageable with the stopper to hold the motor holder in the second position against the biasing force of the biasing means, and (f) a first spring portion for biasing the operating lever in a direction that causes the first and second abutment portions to engage the stopper.

In the positioning device of the present invention constructed as described above, the type wheel is installed while the index motor is placed in its inoperative position, that is, while the motor holder is placed in its second position wherein the second abutment portion of the operating lever is held in engagement with the stopper fixedly provided on the carriage. In this second position, the drive shaft of the index motor is not coupled to the type wheel. When the operating lever is operated at its operating portion against the biasing force of the biasing means toward the type wheel, the operating lever moves with the motor holder toward its first position so as to cause the drive shaft of the index motor to engage the type wheel. During the movement of the operating lever toward the type wheel, a pivotal movement of the lever about its pivot portion is prevented by the stopper until the motor holder has been moved to the first position. When the motor holder has been moved to the first position, the operating lever is pivoted about its pivot portion in a direction that causes the first abutment portion to come into engagement with the stopper. This engagement of the first abutment portion with the stopper is maintained by the biasing forces of the first spring portion and the biasing means, whereby the motor holder is kept in its first position even if an operating force acting on the operating portion of the lever is removed. On the other hand, when the operating lever is pivoted about its pivot portion against the biasing force of the first spring portion, the first abutment portion is disengaged from the stopper, and the motor holder is permitted to be moved by the biasing force of the biasing means until the second abutment portion abuts on the stopper, that is, to the second position corresponding to the inoperative position of the index motor. Therefore, the drive shaft of the index motor is disconnected from the type wheel.

The operating lever used in the present positioning device has as integral parts thereof functionally different portions whose functions are served by a plurality of components on the conventional device. Accordingly, the present positioning device uses a reduced nuber of components, and is therefore easy to assemble and economical to manufacture.

According to one advantageous embodiment of the invention, the pivotal support comprises a planar portion parallel to a direction of movements of the carriage, and an opening formed through the planar portion, and the pivot portion comprises a protrusion which extends from the base portion in a direction of movements of the motor holder between the first and second positions, and loosely engages the opening, and retainer means for preventing the protrusion from being moved out of the opening. The operating lever is pivoted about the protrusion in a plane substantially parallel to the direction of movements of the motor holder.

In one form of the above embodiment, the retainer means comprises a retainer portion formed as an integral part of the operating lever. The retainer portion contacts a part of a surface of the planar portion of the pivotal support which is adjacent to the opening and which is opposite to a surface of the planar portion that faces the base portion, whereby the retainer portion holds the protrusion within the opening. The retainer portion elastically yields to permit the protrusion to be inserted into the opening upon assembling of the operating lever in operative connection with the pivotal support.

In another form of the above embodiment, the pivotal support further comprises a stopper portion which extends from the planar portion in substantially the same direction as a direction of extension of the operating lever. The operating portion of the operating lever has inner surfaces defining a void through which the stopper portion extends. The stopper portion is abutable on at least one of opposite surfaces of the inner surfaces of the operating portion of the operating lever, so as to limit at least one of opposite ends of pivotal movements of the operating lever. The operating portion of the operating lever is formed with a retainer portion which extends from a distal end toward a proximal end of the operating portion, such that a free end of the retainer portion is located adjacent to the protrusion of the pivot portion and contacts a part of a surface of the planar portion of the pivotal support which is opposite to a surface of the planar portion that faces the base portion. Thus, the retainer means serves as the retainer portion. The retainer portion elastically yields to permit the protrusion to be inserted into the opening upon assembling of the operating lever in operative connection with the pivotal support.

According to another advantageous embodiment of the invention, the operating portion of the operating lever extends upwardly from the base portion, and the operating lever further comprises as an integral part thereof an arm portion which extends from the base portion in a direction substantially parallel to the direction of movements of the motor holder. The first and second abutment portions are formed on the arm portion such that the first abutment portion is spaced apart from the second abutment portion in the direction of extension of the arm portion. Each of the first and second abutment portions is defined by two surfaces, one of which faces in the direction of extension of the arm portion, and the other of which faces in a direction of extension of the operating portion from the base portion.

According to a further advantageous embodiment of the invention, the first spring portion of the operating lever is a generally sheet-like elastic portion which extends from the base portion in a direction opposite to a direction in which the operating portion extends from the base portion. The sheet-like elastic portion is held in pressed contact with the motor holder and thereby held in its elastically deformed state.

According to a still further advantageous embodiment of the invention, the carriage is slidably supported by a guide rod, and the motor holder is supported by the guide rod pivotally about an axis of the guide rod.

In accordance with a yet further advantageous embodiment of the invention, the operating lever further comprises as an integral part thereof engagement-inhibiting means for inhibiting the first abutment portion from engaging the stopper when the motor holder has been moved from the second position just to the first position. The engagement-inhibiting means permits the first abutment portion to engage the stopper, when an operating force acting on the operating portion is removed after the motor holder has been moved beyond the first position by a predetermined distance in a direction away from the second position.

In one form of the above embodiment the engagement-inhibiting means comprises: a movable piece which is disposed near the first abutment portion and is movable in the direction of movements of the motor holder; restrictor means for defining an operative position of said movable piece at which said movable piece extends from said first abutment portion in a direction from the second position toward the first position; a second spring portion for biasing said movable piece toward said operative position thereof and for thereby holding the movable piece in said operative position thereof. A biasing force of the second spring portion is selected to be smaller than the biasing force of the biasing means. The movable piece inhibits the first abutment portion from engaging the stopper when the motor holder is placed in the first position. The movable piece is engageable with the stopper when the motor holder has been moved beyond the first position by the predetermined distance in the direction away from the second position, whereby the first abutment portion is moved toward the movable piece against the biasing force of said first spring portion. Thus, the movable pieces allows the first abutment portion to engage the stopper. The second spring portion may be a U-shaped portion having a pair of arms, one of which is connected at its end to the base portion, and the other of which is connected at its end to the movable piece.

In the above preferred form of the invention with the engagement-inhibiting means constructed as described above, when the motor holder has been moved from the second position to the first position, the movable piece is held by the biasing force of the second spring portion at a position in which the movable piece extends beyond the first abutment portion of the operating lever, thereby inhibiting the first abutment portion from engaging the stopper. To effect the engagement of the first abutment portion with the stopper, the operating lever must be further operated to cause the motor holder to be moved beyond the first position in a direction away from the second position. This movement of the motor holder enables the drive shaft of the index motor to complete its engagement with the type wheel. Further, the same movement permits the movable piece to engage the stopper. Upon removal of the operating force from the operating portion of the operating lever, the motor holder is returned to its first position by the biasing force of the biasing means which is larger than the biasing force of the second spring portion. In other words, the first abutment portion of the lever is moved relative to the stopped movable piece, until the first abutment portion has been aligned with the end of the movable piece, that is, until the first abutment portion has abutted on the stopper. Thus, the motor holder is held in its first position, holding the index motor in its operative position. When the operating lever is pivoted about its pivot portion against the biasing force of the first spring portion, the first abutment portion is disengaged from the stopper, allowing the operating lever and the motor holder to be moved to the second position by the biasing force of the biasing means. Simultaneously, the disengagement of the first abutment portion from the stopper permits the movable piece to be moved to its operative position by the biasing force of the second spring portion, to inhibit the first abutment portion from engaging the stopper even when the motor holder has reached its first position. The operative position of the movable piece is determined by the restrictor means.

The movable piece, restrictor means and second spring portion of the engagement-inhibiting means are all formed as integral parts of the operating lever. Accordingly, the provision of the engagement-inhibiting means will not increase the number of components of the positioning device, nor will it complicate the assembling procedure, whereby the cost of manufacture is held to a minimum.

In a preferred arrangement of the above form of the invention, the operating lever further comprises an an integral part thereof an arm portion which extends from the base portion in a direction substantially parallel to the direction of movements of the motor holder. The arm portion has a slot formed in its longitudinal direction, such that the slot has an opening at an end of the arm portion remote from the base portion, the opening is narrower than the remianer of the slot. In this case, the restrictor means of the engagement-inhibiting means may comprise the arm portion having the slot, and an arrowhead formed integrally with the movable piece, the arrowhead being forced into the slot, upon assembling of the engagement-inhibiting means, with elastic deformation of the arm portion to permit the arrowhead to pass the opening of the slot, the opening preventing the arrowhead from being moved out of the slot.

BRIEF DESCRIPTION OF THE DRAWINGS

The above and other objects, features and advantages of the present invention will become more apparent from reading the following detailed description of a preferred embodiment of the invention, when considered in connection with the accompanying drawings, in which.

DETAILED DESCRIPTION OF THE PREFERRED EMBDODIMENT

To further clarify the concept of the present invention, a preferred embodiment of the invention will be described in detail by reference to FIGS. 1-5 of the accompanying drawings.

Figure 1:
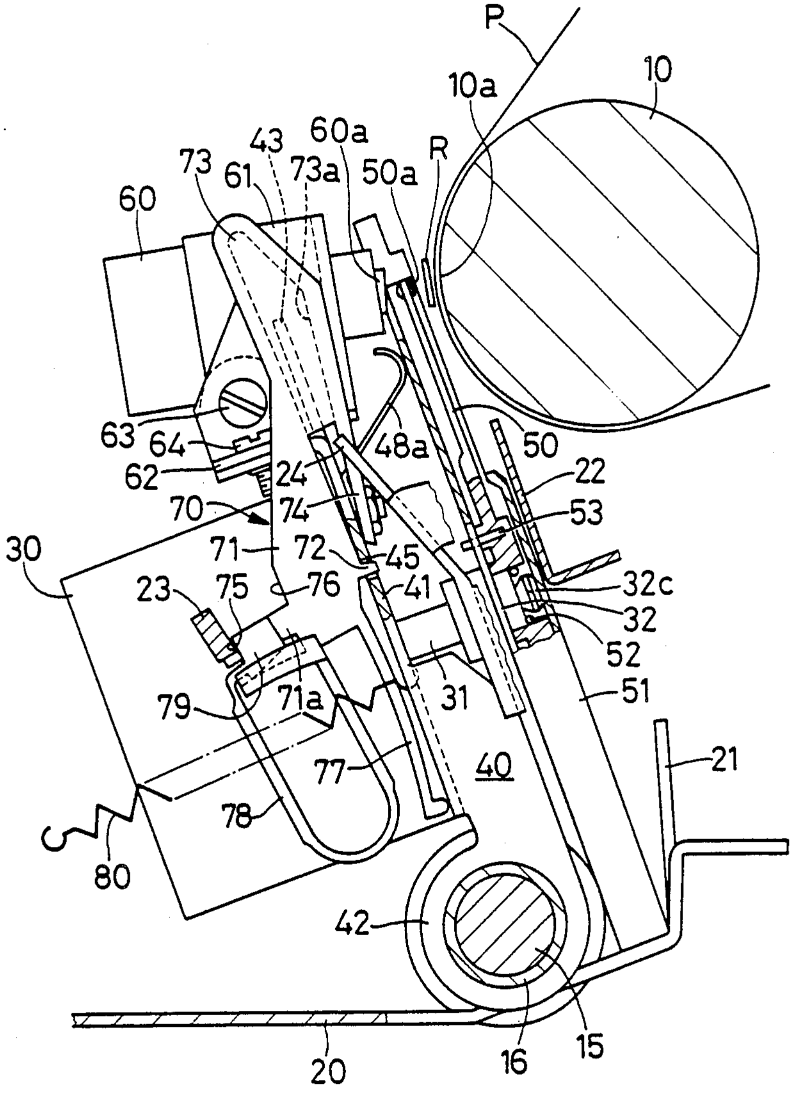
FIG. 1 is a side elevational view in cross section of one embodiment of a motor positioning device of the invention incorporated in a printer, showing a type wheel index motor held in its normal or operative position by the motor positioning device.
Figure 2:
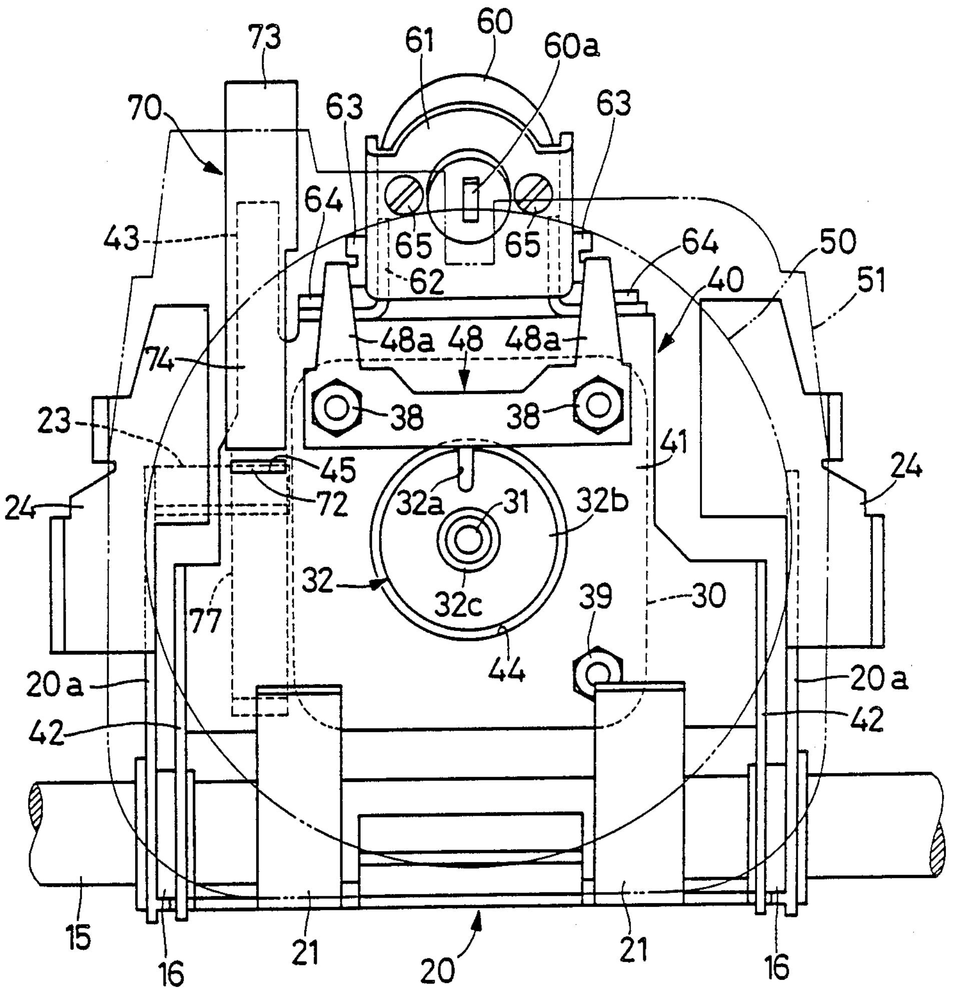
FIG. 2 is a front elevational view of the positioning device of FIG. 1, with some parts shown in FIG. 1 removed.
Figure 3:
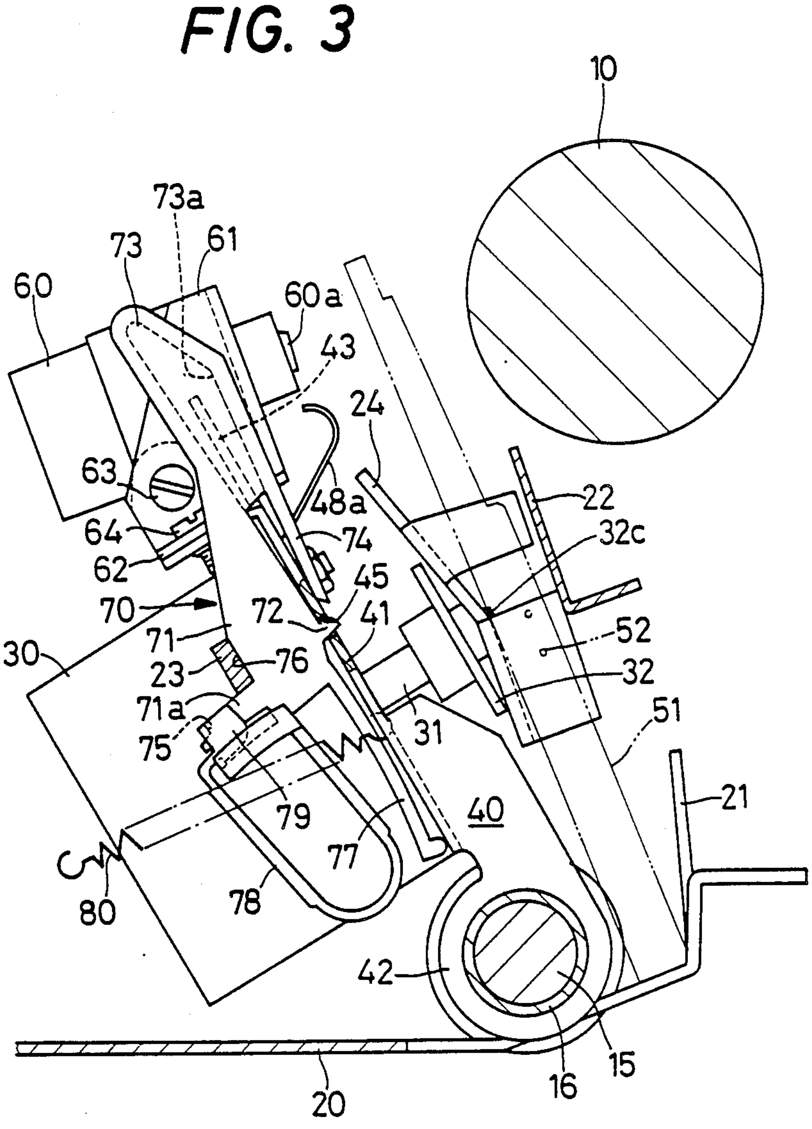
FIG. 3 is a side elevational view in cross section, corresponding to FIG. 1, showing the index motor held in its retracted or inoperative position in which a type wheel can be installed and removed.
Figure 4:
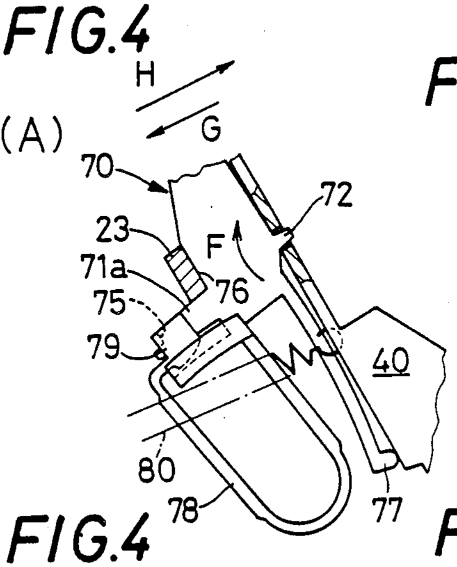
FIG. 4(A) through FIG. 4(E) are fragmentary enlarged side elevational views, illustrating events of operation of the positioning device.
Figure 4:
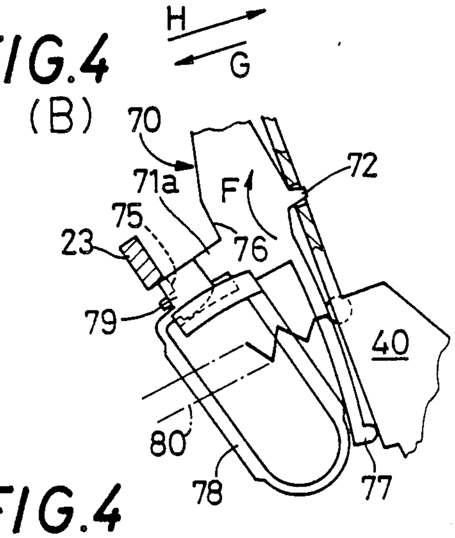
Figure 4:
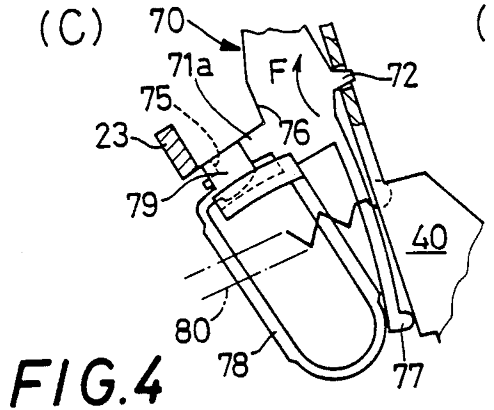
Figure 4:
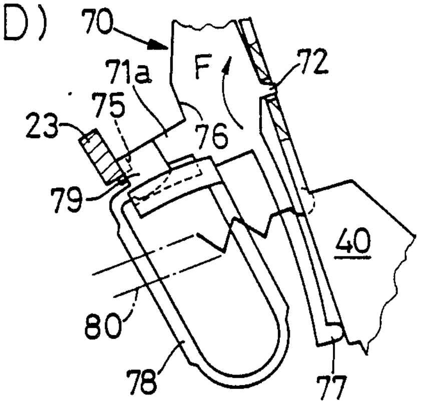
Figure 4:
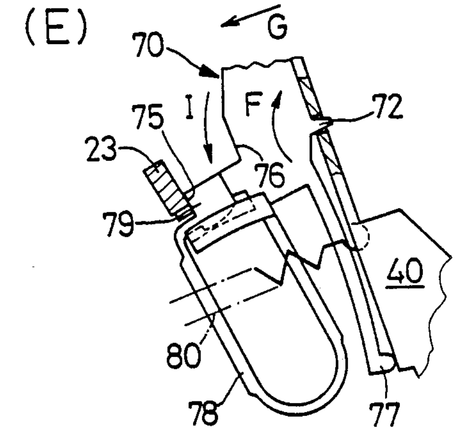

Referring to FIGS. 1, 2 and 3, there is shown a positioning device for positioning an index motor 30 of a printer between a normal or operative position of FIG. 1 and a retracted or inoperative position of FIG. 3. In the operative position, a drive shaft 31 of the index motor 30 is coupled to a type wheel 50 which is rotated by the index motor 30, in order to select one of a multiplicity of type fonts 50*a* which are formed in spaced-apart relation with each other circumferentially of the type wheel 50. In the inoperative position, the drive shaft 31 of the index motor 30 is disconnected from the type wheel 50, allowing the type wheel 50 to be changed from one to another.

The printer has a carriage 20 which is slidably supported via bearings 16 by a guide rod 15 which extends parallel to a platen 10, so that the carriage 20 may be reciprocated along the platen 10 by suitable drive means as well known in the art. On one end of the carriage 20 on the side of the platen 10, there are fixed a pair of guide plates 21 which extend upright toward the platen 10 and are spaced from each other along the guide rod 15. Spaced upwardly from the tips of the guide plates 21, an abutment plate 22 is fixed to the carriage 20 such that the abutment plate 22 extends parallel to the platen 10. The carriage 20 further has a bent plate 24 which is located opposite to the abutment plate 22. The bent plate 24 has a slightly bent upper section so that a distance between the upper section and the abutment plate 22 increases in a direction from the lower end toward the upper end of the bent upper section. The carriage 20 has opposite side walls 20*a*. From one of these opposite side walls 20*a*, a stopper 23 extends horizontally parallel to the platen 10 toward the other side wall 20*a*, in a cantilever fashion.

In the meantime, a motor holder 40 for supporting the index motor 30 is supported by the guide rod 15 via the bearings 16, pivotally about the axis of the guide rod 15. The motor holder 40 has a planar portion 41, a stopper portion 43 which extends upwardly from one of opposite lateral ends of the planar portion 41, and leg portions 42 which extends downwardly from the opposite lateral ends of the planar portion 41. The leg portions 42 fit on the bearings 16 on the guide rod 15, whereby the motor holder 40 is slidably movable on the guide rod 15 along the platen 10 together with the carriage 20, and is pivotable between its first and second positions corresponding to the operative and inoperative positions of the index motor 30. The motor holder 40 is biased toward its second position (in the direction away from the platen 10) under a biasing action of biasing means in the form of a coil spring 80 which is connected at one end to the planar portion 41 and at the other end to the carriage 20. The planar portion 41 of the motor holder 40 has a circular aperture 44 in its central part, and the stopper portion 43 has a rectangular opening 45 in its lower part.

The index motor 30 for rotating the type wheel 50 is fixed with nuts 38, 39 to the planar portion 41 of the motor holder 40 such that its drive shaft 31 extends through the previously indicated circular aperture 44 in the planar portion 41. The drive shaft 31 is provided at its free end with a flange 32 which includes a disk portion 32*b*, and a generally diamond-shaped head portion 32*c* extending from the center of the disk portion 32*b* in the axial direction of the drive shaft 31. The disk portion 32*b* has a radial cutout 32*a* which is open at its periphery.

A hammer unit 60 having a print hammer 61 is attached with screws 65 to a head holder 61 which is secured by L-shaped brackets 62 to the top of the motor holder 40 with screws 63, 64.

In the above arrangement, the index motor 30 and the hammer unit 60 are moved with the motor holder 40 when the motor holder 40 is pivoted about the guide rod 15.

The type wheel 50 with the multiple type fonts 50*a* corresponding to characters to be printed is accommodated rotatably in a cassette 51. The type wheel 50 has a center hole to accommodate the previously described head portion 32*c* of the drive shaft 31 of the index motor 30. The central portion of the type wheel 50 has a torsion spring 52 which is disposed so as to be engageable with the head portion 32*c* in a manner well known in the art. The type wheel 50 further has a pin 53 which is located adjacent to the central hole so as to be engageable with the radial cutout 32*a* in the flange 32 of the drive shaft 31. The engagement of the pin 53 with the radial cutout 32*a* permits the type wheel 50 to be oriented in its predetermined home position, and enables the type wheel 50 to be rotated by the drive shaft 31. The type font 50*a* which is selected through rotation of the type wheel 50 by the index motor 30 is positioned between a surface 10*a* of the platen 10 and the print hammer 60*a*, as indicated in FIG. 1. The selected type font 50*a* is hammered by the print hammer 60*a* and thus impressed against the surface of a paper P via a ribbon R.

An elastic presser plate 48 with a pair of flexible arms 48*a* at its opposite ends is fixed with the nuts 38 to the planar portion 41 of the motor holder 40. The flexible arms 48*a* resiliently contact the rear surface of the cassette 51 so as to press the cassette 51 against the abutment plate 22. Thus, the cassette 51 is held in place without rattling movements.

Figure 5:
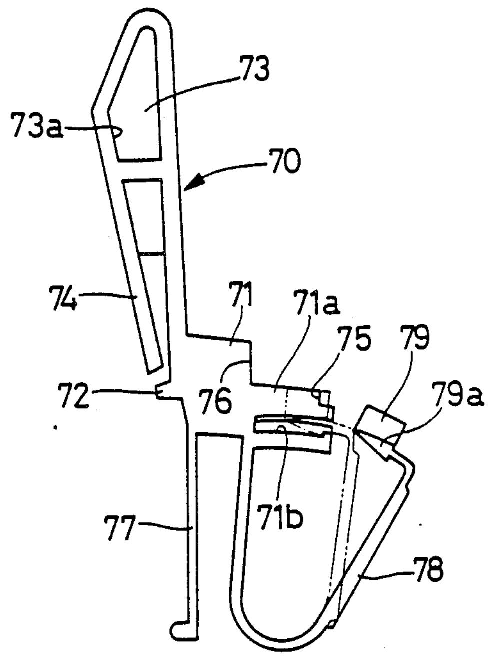
FIG. 5 is a side elevational view of an operating lever of the motor positioning device.

The operating lever 70 previously referred to in connection with the stopper portion 43, is made of a suitable resin having elasticity. As illustrated in FIG. 5, the operating lever 70 comprises as integral parts thereof: a base portion 71; an operating portion 73 which extends upwardly from the base portion 71, and at which the operating lever 70 is manipulated by the operator of the printer; a retainer portion 74 which extends downwardly from the operating portion 73; a pivot portion in the form of a protrusion 72 which extends from the base portion 71 toward the abutment plate 22, in a direction parallel to the drive shaft 31 of the index motor 30, and engages the previously described rectangular opening 45 in the motor holder 40, so that the operating lever is pivotable in a plane parallel to the drive shaft 31 and perpendicular to the guide rod 15; an arm portion 71*a* which extends from the base portion 71 away from the abutment plate 22, in a direction parallel to the drive shaft 31; a first spring portion 77 of a generally sheet-like shape which extends downwardly from the base portion 71; a U-shaped second spring portion 78 having a pair of arms one of which extends downwardly from the arm portion 71*a;* and a movable piece 79 with an arrowhead 79*a* which is connected to the free end of the U-shaped second spring portion 78.

The arm portion 71*a* has, in its lower part, a slot 71*b* which is formed along its length, i.e., in the direction of extension of the arm portion 71*a*. The slot 71*b* has an opening at the end of the arm portion 71*a* remote from the base portion 71. This opening is narrower than the remainer of the slot 71*b*. The arm portion 71*a* provides a first abutment portion 75, which is defined by two surfaces provided by a cutout in the upper surface of the arm portion 71*a* near the opening of the slot 71*b*. As shown in FIG. 1, one of these surfaces faces in the direction of extension of the arm portion 71*a* from the base portion 71, and the other surface faces in the direction of extension of the operating portion 73 from the base portion 71. In the meantime, the arm portion 71*a* cooperates with the base portion 71 to provide a second abutment portion 76, which is defined by two surfaces one of which faces in the direction of extension of the arm portion 71*a* from the base portion 71, and the other of which faces in the direction of extension of the operating portion 73 from the base portion 71.

As shown in FIG. 5, the other one of the two arms of the U-shaped second spring portion 78 which is not connected to the arm portion 71*a* terminates in the arrowhead 79*a* such that the arrowhead 79*a* is bent inwardly of the spring portion 78. The operating lever 70 assumes its natural shape as indicated in solid line in FIG. 5. More specifically described, the arrowhead 79*a* and the movable piece 79 are spaced a slight distance away from the end of the arm portion 71*a*. The movable piece 79 is secured to one of opposite sides of the arrowhead 79*a*, so that the movable piece 79 is located on one side of the arm portion 71*a* when the arrowhead 79*a* is received within the slot 71*b* in a manner described below.

To put the arrowhead 79*a* into the slot 71*b*, the above-indicated other arm of the U-shaped second spring portion 78 is deflected toward the arm portion 71*a* against the biasing force of the spring portion 78, such that the arrowhead 79*a* is forced into the slot 71*b* through its opening at the end of the arm portion 71*a*. At this time, the upper and lower sections defining the slot 71*b* of the arm portion 71*a* elastically yield so as to allow the arrowhead 79*a* to pass through the opening of the slot 71*b*, thereby permitting the arrowhead 79*a* to be inserted into the slot 71*b*. In this condition, the movable piece 79 located adjacent to the surface of the arm portion 71*a*, and the arrowhead 79*a* in the slot 71*b* are biased in the direction away from the base portion 71 (to the right in FIG. 5), under a biasing action of the second spring portion 78. However, the movable piece 79 is prevented, by the arrowhead 79*a* and the opening of the slot 71*b*, from being moved out of the slot 71*b*, whereby the movable piece 79 with the arrowhead 79 is normally held in its operative position indicated in phantom line in FIG. 5. Thus, the arrowhead 79*a* and the slot 71*b* cooperate to provide restrictor means for defining the operative position of the movable piece 79 at which the movable piece extends from the first abutment portion 75 by a suitable distance. It is noted that when the movable piece 79 is located in the position indicated in phantom line in FIG. 5, a part of the movable piece 79 extends from the abutment surface of the first abutment portion 75 in the direction of extension of the arm portion 71*a* from the base portion 71. Further, the movable piece 79 is adapted such that its upper surface is flush with the upper surface of the arm portion 71*a*.

The operating lever 70 is mounted on the motor holder 40 in the following state. The operating lever 70 is positioned such that the protrusion 72 is inserted through the rectangular opening 45 in the planar portion 41 of the motor holder 40, as shown in FIG. 1, and such that the stopper portion 43 of the motor holder 40 extends in a void formed in the operating portion 73, as indicated in broken line in FIG. 1. In this condition, the retainer portion 74 is held in contact with the outer surface of the planar portion 71 which is remote from the base portion 41. More precisely, the retainer portion 74 contacts a part of the outer surface of the planar portion 41 which is adjacent to the opening 45. Meanwhile, the first spring portion 77 is held in pressed contact with the inner surface of the planar portion 41 of the motor holder 40. In positioning the operating lever 70 as indicated above, the retainer portion 74 elastically yields to permit the protrusion 72 to be inserted into the rectangular opening 45.

Referring further to FIGS. 4(A) through 4(E) in addition to FIGS. 1 and 3, there will be described a manner in which the operating lever 70 is operated to move the index motor 30 (motor holder 40) from the inoperative position (second position) of FIG. 3 to the operative position (first position) of FIG. 1, and vice versa.

While the motor holder 40 is placed in the second position of FIG. 3, the cassette 51 is inserted into a space defined by the abutment plate 22, bent plate 24 and the guide plates 21, and thus installed as indicated in phantom line in FIG. 3. The relation of the operating lever 70 with respect to the stopper 23 and the motor holder 40 in its second position is illustrated in a fragmentary view of FIG. 4(A). In this condition, the motor holder 40 is biased by the coil spring 80 in a direction indicated by arrow G, so as to cause the motor holder 40 to pivot about the guide rod 15 in the counterclockwise direction. In the meantime, the operating lever 70 is biased by its first spring portion 77 in a direction indicated by arrow F, so as to cause the operating lever to pivot about its protrusion 72 in the clockwise direction. Meanwhile, the second abutment portion 76 is held in abutting contact with the stopper 23, whereby the motor holder 40 and the operating lever 70 are held in the second position of FIG. 3 or FIG. 4(A) due to the biasing forces of the coil spring 80 and the first spring portion 77.

When the operating portion 73 of the operating lever 70 is moved to pivot the operating lever 70 and the motor holder 40 about the guide rod 15 in a direction of arrow H against the biasing force of the coil spring 80, the upper surface of the arm portion 71*a* slides on the lower surface of the stopper 23. At this time, the stopper 23 bears the moment which is acting in the direction F due to an operating force on the operating portion 73 and the biasing force of the first spring portion 77. With a predetermined angle of pivotal movement of the operating lever 70, the motor holder 40 is located at its first position in which the presser plate 48 presses the cassette 51 against the abutment plate 22. In this position, however, the head portion 32*c* of the flange 32 of the drive shaft 31 may or may not properly engage, but at least contacts the torsion spring 52 of the type wheel 50, since the type wheel 50 made of an elastic resin material may be slightly deflected by a depressing force of the head portion 32*c* acting on the torsion spring 52, and since the torsion spring 52 elastically yields in a slight degree. To assure perfect or complete engagement of the head portion 32*c* with the torsion spring 52, the first abutment portion 75 is prevented by the movable piece 79 from engaging the stopper 23 because the stopper 23 is still in contact with the upper surface of the movable piece 79 which is flush with the upper surface of the arm portion 71*a*, as illustrated in FIG. 4(B). Therefore, the operating lever 70 and the motor holder 40 are prevented from being locked in the first position at this time. With a further pivotal movement of the operating lever 70 about the guide rod 15 in the clockwise direction H from the position of FIG. 4(B) to the position of FIG. 4(C), the drive shaft 31 is further moved by a slight distance which is sufficient for the head portion 32*c* to complete the engagement with the torsion spring 52. As soon as the operating lever 70 has been moved to a point at which the movable piece 79 is spaced a slight distance away from the stopper 23 as indicated in FIG. 4(C), the operating lever 70 is permitted to pivot about its protrusion 72 in the clockwise direction F, whereby the end face of the movable piece 79 is brought into engagement with the side surface of the stopper 23 as illustrated in FIG. 4(D). When a force acting on the operating portion 73 of the lever 70 is removed in this condition, the lever 70 and the motor holder 40 are pivoted about the guide rod 15 in the counterclockwise direction G as indicated in FIG. 4(E) by the biasing force of the coil spring 80, and thus returned to the first position of FIG. 4(E) and FIG. 1. In this connection, it is noted that the movable piece 79 is forced against the stopper 23 by the biasing force of the second spring portion 78, and the arm portion 71*a* is moved relative to the stopped movable piece 79 toward the stopper 23, since the biasing force of the coil spring 80 is larger than that of the second spring portion 78. Namely, the arm portion 71*a* is moved relative to the movable piece 79 with a relative movement of the arrowhead 79*a* in the slot 71*b*, until the first abutment portion 75 is aligned with the movable piece 79 as indicated in FIG. 4(E). In this condition, the biasing forces of the coil spring 80 and the first spring portion 77 are exerted on the stopper 23, whereby the motor holder 40 is held in its first position in which the index motor 30 is placed in its operative position of FIG. 1. In this way, the positioning of the index motor 30 from its inoperative position to its operative position is completed.

When the index motor 30 is moved from the operative position of FIG. 1 to the inoperative position of FIG. 3, the operating portion 73 of the operating lever 70 is pushed in the counterclockwise direction I from its first position of FIG. 4(E) against the biasing force of the first spring portion 77 which acts in the clockwise direction F. Consequently, the operating lever 70 is pivoted counterclockwise about the protrusion 72, to the position of FIG. 4(C), whereby the movable piece 79 is moved away from the first abutment portion 75, to the position of FIG. 4(B). Thus, the first abutment portion 75 is disengaged from the stopper 23, and the operating lever 70 and the motor holder 40 are pivoted about the guide rod 15, in the counterclockwise direction G, by the biasing force of the coil spring 80, until the second abutment portion 76 abuts on the stopper 23 as indicated in FIG. 4(A). In this manner, the motor holder 40 is located in the second position of FIG. 3. During the pivotal movement of the motor holder 40 from its first position to its second position, the cassette 51 is held in position by the bent plate 24. Hence, the movement of the drive shaft 31 caused by the pivotal movement of the motor holder 40 causes the head portion 32*c* on the flange 32 to be disengaged from the torsion spring 52 of the type wheel 50, whereby the drive shaft 31 is disconnected from the type wheel 50. Thus, the cassette 51 can be removed, for replacement of the type wheel 50 with another type wheel.

The previously indicated stopper portion 43 which extends from the planar portion 41 of the motor holder 40 serves to prevent an excessive amount of pivotal movement of the operating lever 7 about the protrusion 72 in the counterclockwise direction. More specifically, the operating portion 73 of the operating lever 70 has a void through which the stopper portion 43 extends. The void is defined by inner surfaces which includes a surface 73*a*. Although the stopper portion 43 does not abut on any of the inner surfaces of the operating portion 73 as long as the operating lever 70 is operated in a normal manner, the stopper portion 43 abuts on the inner surface 73*a* if the operating lever 70 is operated in the counterclockwise direction (in the figures) with an excessive operating force when the motor holder is moved from the first position of FIG. 1 to the second position of FIG. 3. The abutment of the stopper portion 43 on the inner surface 73*a* protects the first spring portion 77 against excessive deflection.

While the present invention has been described in detail in its preferred embodiment, it is to be understood that the invention is not confined to the precise disclosure contained herein, but the invention may be embodied with various changes, modifications and improvements which may occur to those skilled in the art, without departing from the spirit and scope of the invention defined in the appended claims.

For example, the principle of the invention may be practiced without the provision of the movable piece 79, arrowhead 79*a*, second spring portion 79, and slot 71*b*, which cooperate to constitute means for inhibiting the first abutment portion 75 from engaging the stopper 23 even when the motor holder 40 has been moved to its first position indicated in FIG. 4(B). If this inhibiting means is not provided, the first abutment portion 75 is permitted to engage the stopper 23 when the motor holder 40 has been located at its first position.

What is claimed is:

1. A positioning device for positioning an index motor for a type wheel selectively in an operative and an inoperative position in a printer, the index motor having a drive shaft which is removably engageable with the type wheel, when the index motor is moved to the operative position, to rotate the type wheel for selecting each of multiple type fonts provided on the type wheel, the drive shaft being disengageable from the type wheel when the index motor is moved to the inoperative position, the printer further including: a platen; a carriage movable along the platen, the movement of the carriage defining a carriage movement path; a motor holder provided on the carriage to support the index motor in the operative and inoperative positions, the motor holder being movable between a first and a second position corresponding to the operative and inoperative positions, respectively, the movement of the motor holder defining a motor holder movement path;

and biasing means for biasing the motor holder toward its second position, said positioning device comprising:

a stopper fixedly provided on said carriage;

a pivotal support fixedly provided on said motor holder; and an operating lever comprising as integral parts thereof (a) a base portion, (b) a pivot portion which is adjacent to said base portion, and at which the operating lever is supported by said pivotal support, (c) an operating portion which extends from said base portion, and at which the operating lever is manipulated by an operator of the printer, (d) a first abutment portion engageable with said stopper to hold said motor holder in said first position against a biasing force of said biasing means, (e) a second abutment portion engageable with said stopper to hold said motor holder in said second position against said biasing force of said biasing means, and (f) a first spring portion for biasing the operating lever in a direction that causes said first and second abutment positions to engage said stopper.

2. A positioning device according to claim 1, wherein said pivotal support comprises a planar portion substantially parallel to said carriage movement path, and an opening formed through said planar portion, said pivot portion comprising a protrusion which extends from said base portion so as to loosely engage said opening, and further comprising retainer means for preventing said protrusion from being moved out of said opening, said operating lever being pivoted about said protrusion in a plane substantially parallel to said direction of movements of said motor holder.

3. A positioning device according to claim 2, wherein said retainer means comprises a retainer portion formed as an integral part of said operating lever, said retainer portion contacting a part of a surface of said planar portion of said pivotal support which is adjacent to said opening and which is opposite to a surface of the planar portion that faces said base portion, whereby said retainer portion holds said protrusion within said opening, said retainer portion elastically yielding to permit said protrusion to be inserted into said opening upon assembling of said operating lever in operative connection with said pivotal support.

4. A positioning device according to claim 2, wherein said pivotal support further comprises a stopper portion which extends from said planar portion in substantially the same direction as a direction of extension of said operating lever, said operating portion of the operating lever having inner surfaces defining a void through which said stopper portion extends, said stopper portion being abutable on at least one of opposite surfaces of said inner surfaces of said operating portion of the operating lever, thereby limiting at least one of opposite ends of pivotal movements of said operating lever, said operating portion of the operating lever being formed with a retainer portion which extends from a distal end toward a proximal end of said operating portion, a free end of said retainer portion being located adjacent to said protrusion of the pivot portion and contacting a part of a surface of said planar portion of said pivotal support which is opposite to a surface of the planar portion that faces said base portion, whereby said retainer portion functions as said retainer means, said retainer means elastically yielding to permit said protrusion to be inserted into said opening upon assembling of said operating lever in operative connection with said pivotal support.

5. A positioning device according to claim 1, wherein said pivotal support further comprises a stopper portion which extends in substantially the same direction as a direction of extension of said operating lever, said operating portion of the operating lever having inner surfaces defining a void through which said stopper portion extends, said stopper portion being abutable on at least one of opposite surfaces of said inner surfaces of said operating portion of the operating lever, thereby limiting at least one of opposite ends of pivotal movements of said operating lever.

6. A positioning device according to claim 1, wherein said operating portion of the operating lever extends upwardly from said base portion, and said operating lever further comprising as an integral part thereof an arm portion which extends from said base portion in a direction substantially parallel to said motor holder movement path, said first and second abutment portions being formed on said arm portion such that the first abutment portion is spaced apart from said second abutment portion in the direction of extension of said arm portion, each of said first and second abutment portions being defined by two surfaces, one of which faces in said direction of extension of the arm portion, and the other of which faces in a direction of extension of said operating portion from said base portion.

7. A positioning device according to claim 1, wherein said first spring portion of said operating lever is a generally sheet-like elastic portion which extends from said base portion in a direction opposite to a direction in which said operating portion extends from said base portion, said sheet-like elastic portion being held in pressed contact with said motor holder and thereby held in its elastically deformed state.

8. A positioning device according to claim 1, wherein said carriage is slidably supported by a guide rod, and said motor holder is supported by said guide rod pivotally about an axis of the guide rod.

9. A positioning device according to claim 1, wherein said operating lever further comprises as an integral part thereof engagement-inhibiting means for inhibiting said first abutment portion from engaging said stopper when said motor holder has been moved from said second position just to said first position, but permitting said first abutment portion to engage said stopper when an operating force acting on said operating portion is removed after said motor holder has been moved beyond said first position by a predetermined distance in a direction away from said second position.

10. A positioning device according to claim 9, wherein said engagement-inhibiting means comprises:

a movable piece which is disposed near said first abutment portion and is movable substantially parallel to said motor holder movement path;

restrictor means for defining an operative position of said movable piece at which said movable piece extends from said first abutment portion in a direction from said second position toward said first position; and a second spring portion for biasing said movable piece toward said operative position thereof and for holding said movable piece in said operative position thereof, a biasing force of said second spring portion being smaller than the biasing force of said biasing means, said movable piece inhibiting said first abutment portion from engaging said stopper when said motor holder is placed in said first position, said movable piece being engageable with said stopper when said motor holder has been moved beyond said first position by said predetermined distance in the direction away from said second position, whereby said first abutment portion is moved toward said movable piece against the biasing force of said second spring portion, thereby permitting said first abutment portion to engage said stopper.

11. A positioning device according to claim 10, wherein said second spring portion is a U-shaped portion having a pair of arms, one of said pair of arms being connected at its end to said base portion, and the other arm being connected at its end to said movable piece.

12. A positioning device according to claim 10, wherein said operating lever further comprises as an integral part thereof an arm portion which extends from said base portion in a direction substantially parallel to said motor holder movement path, said arm portion having a slot formed in its longitudinal direction, said slot having an opening at an end of said arm portion remote from said base portion, said opening is narrower than the remiander of the slot, said restrictor means of said engagement-inhibiting means comprising said arm portion having said slot, and an arrowhead formed integrally with said movable piece, said arrowhead being forced into said slot, upon assembling of said engagement-inhibiting means, with elastic deformation of said arm portion to permit said arrowhead to pass said opening of said slot, said opening preventing said arrowhead from being moved out of said slot.

* * * * *